United States Patent [19]
Roederer et al.

[11] Patent Number: 5,696,670
[45] Date of Patent: Dec. 9, 1997

[54] POWER SUPPLY FOR ARC-DISCHARGE LOAD

[75] Inventors: David A. Roederer, Frankfort, Ky.; Norman D. Neal, Loveland, Ohio

[73] Assignee: Webster Heating and Specialty Products, Inc., Frankfort, Ky.

[21] Appl. No.: 451,857

[22] Filed: May 26, 1995

[51] Int. Cl.⁶ .................. H02M 3/335; H02M 1/12; H05B 41/16
[52] U.S. Cl. .................. 363/21; 363/41; 315/DIG. 7
[58] Field of Search .................. 363/20, 21, 41, 363/97, 47, 48; 315/DIG. 4, DIG. 5, DIG. 7

[56] References Cited

U.S. PATENT DOCUMENTS

| | | | |
|---|---|---|---|
| Re. 32,904 | 4/1989 | Pacholok | 363/131 |
| 3,825,814 | 7/1974 | Pelly | 363/47 |
| 4,682,081 | 7/1987 | Sikora | 315/219 |
| 4,698,741 | 10/1987 | Pacholok | 363/131 |
| 4,800,323 | 1/1989 | Sikora | 315/219 |
| 4,885,671 | 12/1989 | Peil | 363/26 |
| 4,904,907 | 2/1990 | Allison et al. | 315/DIG. 7 |
| 5,051,665 | 9/1991 | Garrison et al. | 315/287 |
| 5,097,182 | 3/1992 | Kelly | 315/219 |
| 5,144,205 | 9/1992 | Motto et al. | 315/244 |
| 5,170,099 | 12/1992 | Ueoka et al. | 315/DIG. 4 |
| 5,198,727 | 3/1993 | Allen et al. | 315/DIG. 7 |
| 5,343,122 | 8/1994 | Sugimori et al. | 315/209 R |
| 5,363,020 | 11/1994 | Chen et al. | 315/209 R |
| 5,381,077 | 1/1995 | McGuire | 315/DIG. 4 |
| 5,384,518 | 1/1995 | Kido et al. | 315/DIG. 7 |
| 5,391,966 | 2/1995 | Garrison | 315/DIG. 7 |
| 5,408,401 | 4/1995 | Miyazaki | 363/21 |

*Primary Examiner*—Peter S. Wong
*Assistant Examiner*—Bao Q. Vu
*Attorney, Agent, or Firm*—Jansson & Shupe, Ltd.

[57] ABSTRACT

The power supply, well suited for powering a metal halide lamp, includes a rectifier with an AC input and a DC output. A power transformer has its primary winding connected to the DC output and its secondary winding connected to the lamp. A pulse-width-modulated (PWM) controller is coupled to the primary winding for controlling the flow of power therethrough. A smoothing circuit is connected to the lamp for reducing the rate of change of the current flowing through the lamp. Avoiding filtering of the rectifier output, maintaining a constant pulse width of the PWM controller throughout the period of the AC input power and filtering switching-frequency current components from the input to the rectifier provides a sinusoidal input current to the power supply which is substantially in phase with the input voltage. Such supply has a power factor of over 99%.

15 Claims, 9 Drawing Sheets

5,696,670

POWER SUPPLY FOR ARC-DISCHARGE LOAD

FIELD OF THE INVENTION

This invention relates generally to electricity and, more particularly, to electric power conversion systems.

BACKGROUND OF THE INVENTION

Electrical power supplies are typically used to drive power-consuming products which, because of their electrical characteristics, cannot be connected directly to, say, a 120 V or 240 V 50/60 Hz electrical line. As an example, an electrical product may require dramatically-different starting and running voltages. Or an electrical device may have an impedance that "wanders" during operation. Such impedance characteristic may require some sort of control of device current for satisfactory operation.

The common television set is a good example of a product requiring a power supply. A television set includes circuits operating at very high voltage, e.g., several thousand volts, and yet such a set operates from 120 V 50/60 Hz household power. In general terms, a power supply is configured and arranged to adapt commonly-available electrical power to the needs of a load which, without such supply, cannot be operated.

One type of product requiring a power supply for operation is a metal halide lamp, a type of lamp using arc-discharge phenomena to produce visible light. While providing a significantly higher level of illumination than an incandescent lamp per unit of power consumed, a metal halide lamp requires, for example, a starting voltage on the order of thousands of volts to "strike" the initial arc. Such a lamp also requires an initial operating voltage on the order of 20–30 volts and rising to a long-term normal operating voltage on the order of one hundred or a few hundred volts as the lamp warms up and its impedance rises. Clearly, a metal halide lamp needs a power supply to operate from a 240 V 50/60 Hz line.

The most common type of power supply for a metal halide lamp is one which draws AC power from an electrical line and applies AC power (albeit at differing voltages) to the lamp. While such power supplies have been generally satisfactory for their intended use, they tend to be characterized by at least one disadvantage. Specifically, they operate at a power factor which is well less than unity (1.0).

(It will be recalled that, in broad general terms, power factor is a measure of how much the current "lags" or "leads" the voltage in an electrical circuit. Unity power factor means that voltage and current are exactly in phase. When a circuit runs at less than unity power factor, it means that reactive volt-amperes (sometimes referred to as "vars") are being circulated in the circuit with attendant power loss. And the lower the power factor, the more onerous the loss. Poor power factor results in elevated circuit temperatures and higher operating costs.)

An improved power supply that overcomes some of the problems associated with poor power factor would be an important advance in the art.

OBJECTS OF THE INVENTION

It is an object of the invention to provide an improved power supply overcoming some of the problems and shortcomings of the prior art.

Another object of the invention is to provide an improved power supply suited for arc-discharge type loads having varying impedance.

Another object of the invention is to provide an improved power supply for a metal halide lamp.

Yet another object of the invention is to provide a power supply for a metal halide lamp which has improved efficiency.

Another object of the invention is to provide an improved power supply which operates at a power factor near unity.

Still another object of the invention is to provide an improved power supply which powers a lamp using DC power.

Another object of the invention is to provide an improved power supply which minimizes the reactive volt-amperes on the AC power line.

Another object of the invention is to provide an improved power supply which minimizes harmonic distortion. How these and other objects are accomplished will become more apparent from the following descriptions and from the drawings.

SUMMARY OF THE INVENTION

The new power supply, particularly well suited for powering a metal halide lamp, includes a rectifier with an AC input and a DC output having a rectified frequency. A power transformer has its primary winding connected to the DC output and unfiltered DC power flows through such winding. The transformer secondary winding is connected to the lamp.

A pulse-width-modulated (PWM) controller is coupled to the primary winding and controls the flow of power through such winding. In a highly-preferred embodiment, the PWM controller has a dual-parameter feedback signal directed to it. Such signal includes a voltage-related component and a current-related component.

The lamp also has a smoothing circuit connected to it for reducing the rate of change of the current flowing through the lamp. The lamp current is thereby said to be "smoothed."

In a more specific aspect of the invention, the smoothing circuit includes a controlled switch (such as a power field effect transistor or "FET") connected to the lamp. A difference amplifier is connected to the switch and such amplifier has applied thereto (a) a reference voltage, and (b) a variable voltage which is a function of the value of the current flowing through the lamp. There is a resistor in series with the lamp and in a highly preferred embodiment, the variable voltage results from lamp current flowing through such resistor.

The power supply has a low-pass filter connected to the PWM controller. Such filter has a cutoff frequency above the rectified frequency so that the PWM controller is made substantially unresponsive to the rectified frequency. To state it in other terms, the cutoff frequency of the filter, while low, is nevertheless sufficiently high to essentially "block" a signal at the rectified frequency.

In another, more specific aspect of the invention, the power supply is connected to an AC power line and includes a line filter interposed between the AC power line and the rectifier. With such line filter, switching transients reflected to the AC power line are substantially prevented from entering the rectifier.

Since a metal halide lamp needs a high starting voltage to "strike" the arc, the new power supply also has a lamp starting circuit coupled between the secondary winding of the power transformer and the lamp. Such starting circuit has a starting transformer with its primary winding connected to a pulse capacitor and its secondary winding connected to the lamp. A voltage pulse from the capacitor is multiplied by the starting transformer and applied to the lamp for lamp ignition.

And there is also a charging circuit for charging the pulse capacitor. The charging circuit is connected to the primary winding of the power transformer and the pulse capacitor is intermittently charged when substantially no current is flowing in such primary winding.

The power supply is described in connection with a metal halide lamp. However, it will be apparent after analyzing the specification and the drawings that such power supply is useful for other arc-discharge types of loads having starting and running impedance characteristics generally like those of a metal halide lamp. Further details of the new power supply are set forth in the following detailed description and in the drawings.

DETAILED DESCRIPTION OF PREFERRED EMBODIMENT

In the following specification, the general arrangement of the new power supply 10 will be described. Such description will be followed by descriptions of the "active" or current-tracking filter 11 and of the starter circuit 13.

Figure 1:
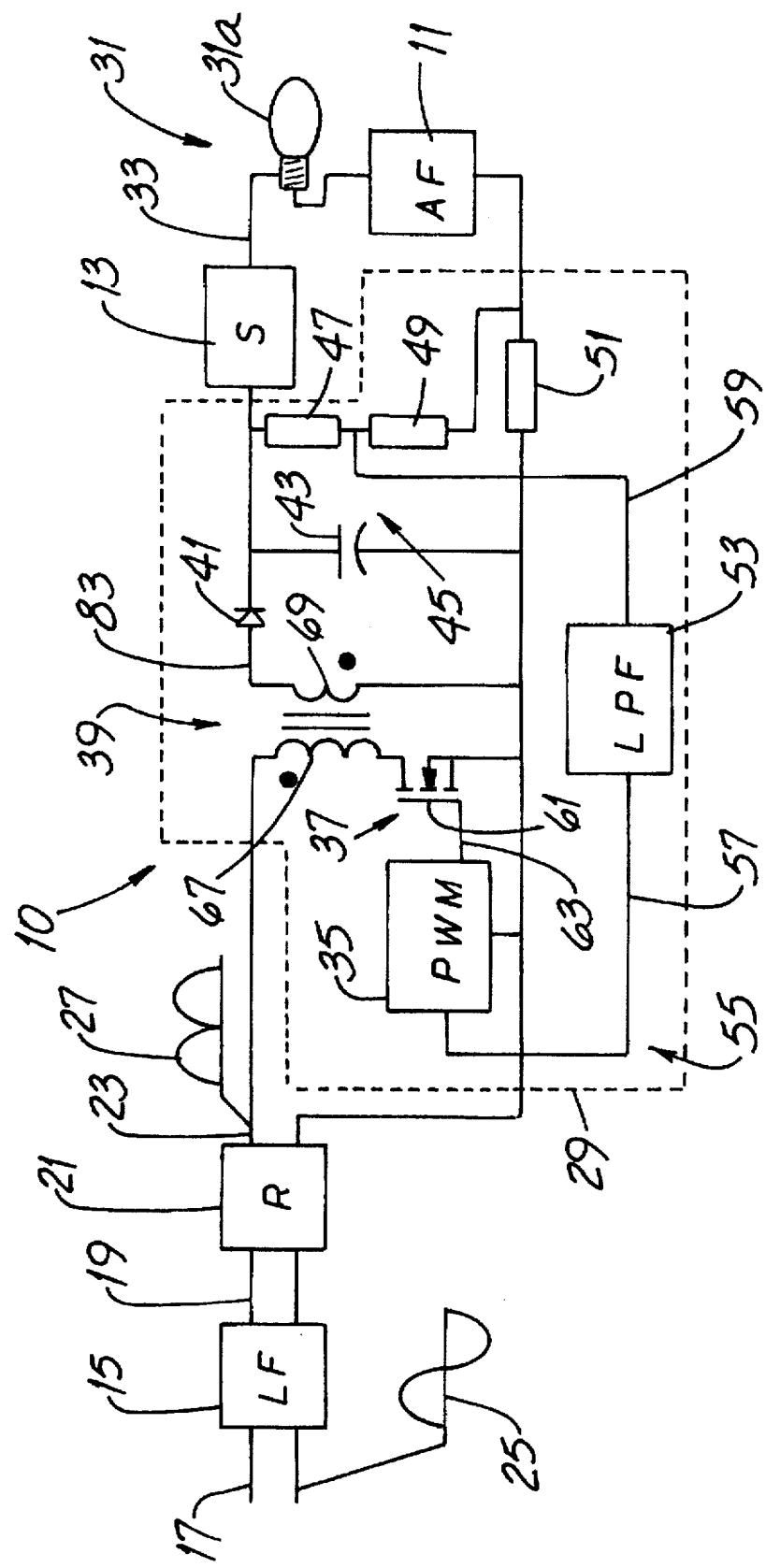
FIG. 1 is a simplified circuit diagram of the new power supply. Portions are shown in block-diagram form.

Referring first to FIG. 1, the new power supply 10 includes an input line filter 15 connected to a conventional power line 17 operating at, e.g., 120 V 50/60 Hz or 240 V 50/60 Hz. Power from the filter 15 is directed along the lines 19 to a full wave rectifier 21, the output of which is along the lines 23. The symbols 25 and 27 depict the AC input power to the filter 15 and the DC output power from the rectifier 21, respectively.

The rectifier output along the lines 23 is unfiltered and provides the supply voltage for a buck-boost regulator 29.

The regulator 29 provides regulated DC voltage to a starter circuit 13, an arc-discharge load 31 (e.g., a metal halide lamp 31a) and an active filter 11 in series. The starter circuit 13 provides a high voltage starting pulse for the lamp 31a and the active filter 11 comprises a rapid response circuit (described in more detail below) to smooth the current flowing along the line 33 and through the lamp 31a.

The regulator 29 includes a pulse width modulated (PWM) controller 35, a switching transistor 37, a power transformer 39, diode 41, a capacitor 43 and a feedback network 45. The network 45 includes voltage-divider resistors 47 and 49, current-sampling resistor 51, and a low-pass filter 53.

As to the PWM controller 35, it is desirable to maintain a substantially constant duty cycle (pulse width) over the period of the voltage on the power line 17. (The period of an AC voltage is the time required for such voltage to make one complete cycle. As an example, the period of a 60 Hz voltage is one-sixtieth of a second.)

To that end, the low-pass filter 53 is connected in the PWM control loop 55, i.e., in the line 57. With the filter 53 so connected, the controller 35 is unresponsive to the rectified power line frequency. Noting the symbol 27 and considering an exemplary 60 HZ line, such rectified frequency is 120 half-wave pulses per second. To state it in other words, the filter 53 makes the output response of the power supply 10 too slow to react to minor current variations in the metal halide lamp 31a. Absent remedial circuitry, such lamp 31a would quickly self-extinguish. The active filter 11 described below helps assure that the power supply 10 has an adequately-short response time to respond to lamp current variations.

At start-up, a typical metal halide 31a lamp requires a higher current at a lower voltage than required during steady-state operation. Merely as an example, a 50 watt metal halide lamp 31a requires one ampere at about 20 volts at start-up (after ignition by a high-voltage arc) and, steady-state, 0.5 ampere at 100 volts. A combination of voltage and current feedback is necessary for the PWM controller 35 and such "dual-parameter" feedback (i.e., with voltage-related and current-related components) controls the output impedance of the power supply 10.

Referring further to FIG. 1, voltage feedback is provided along the line 59 by a voltage divider which includes the resistors 47 and 49. Current feedback is provided by the current sampling resistor 51. The resulting feedback signal is fed through the low-pass filter 53 and is compared to a fixed internal reference voltage in the PWM controller 35. The resulting error signal controls the width of the pulse driving the gate 61 of the switching transistor 37.

Figure 2:
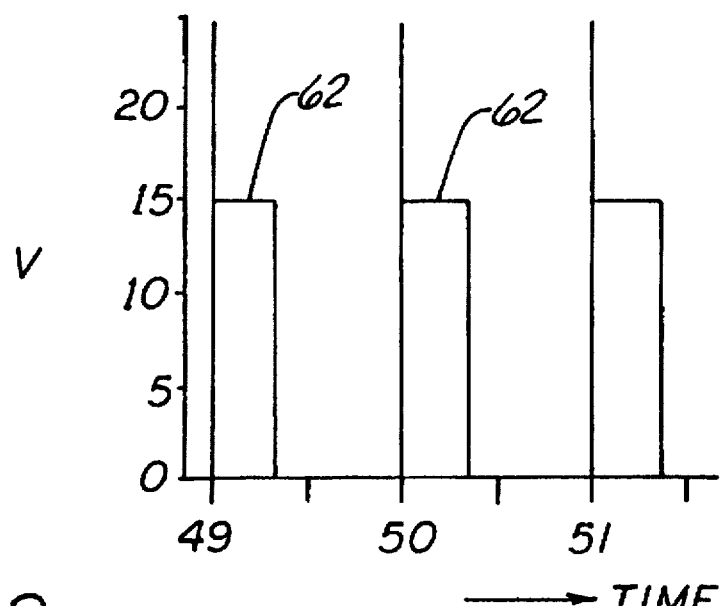
FIG. 2 is a graph showing the steady-state gate driving voltage for the switching transistor controlling the flow of power through the primary winding of the power transformer of the power supply of FIG. 1.

To help appreciate certain electrical phenomena of the supply 10, FIG. 2 shows exemplary pulses 62 on the line 63 of the PWM controller 35. Such pulses are applied to and control the gate 61 of the switching transistor 37 under steady state conditions.

Figure 3:
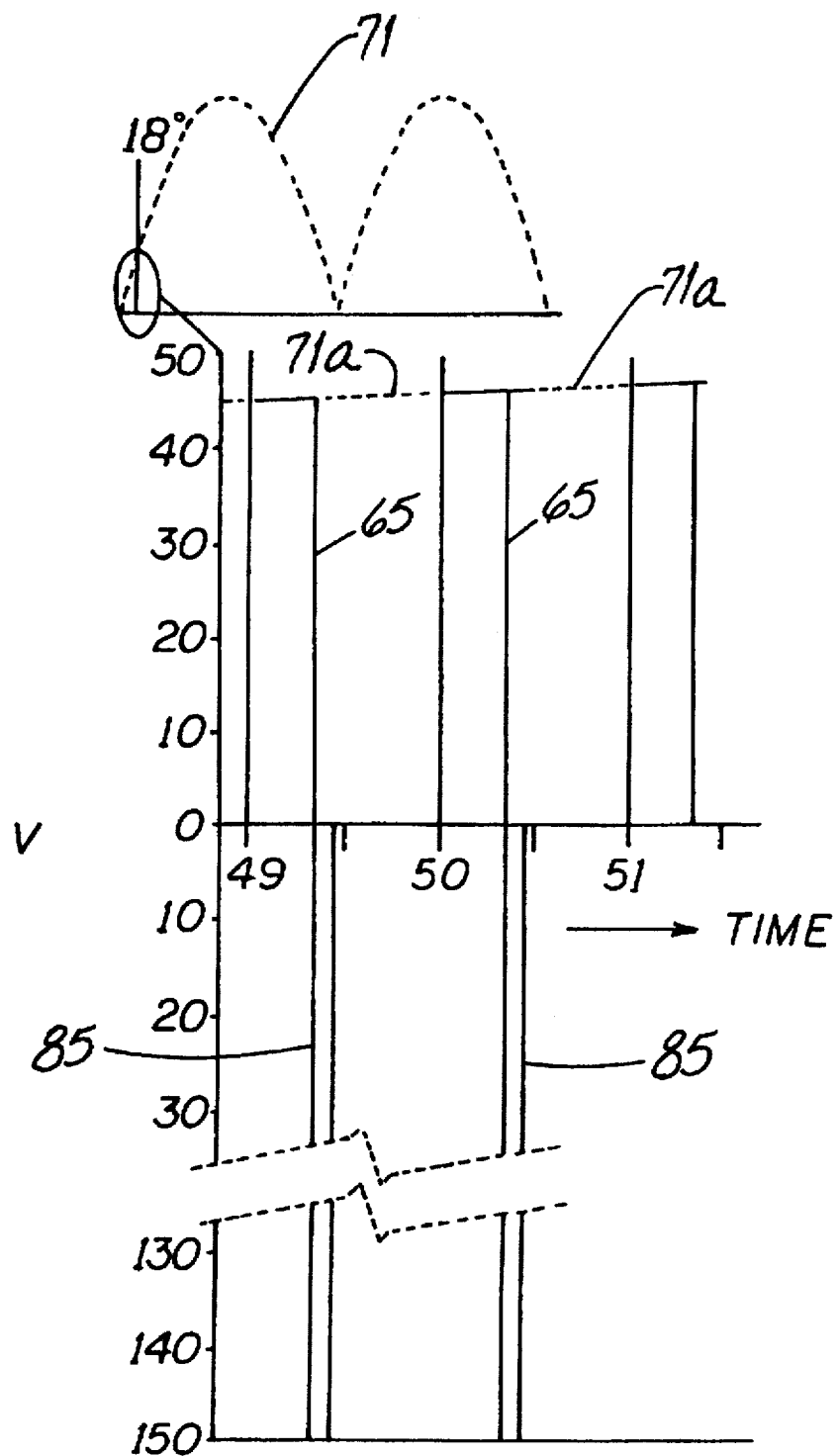
FIG. 3 is a graph showing the voltage across the primary winding of the power transformer which results when the switching transistor is "gated" as shown on the graph of FIG. 2.

FIG. 3 is a graph, the traces 65 of which represent the voltage across the primary winding 67 of the power transformer 39. (In this specification, the primary and secondary windings 67, 69 of the transformer 39 are sometimes referred to as the "power primary winding" and the "power secondary winding," respectively.)

Like the symbol 27, the dashed line 71 represents the full-wave-rectified line voltage applied to one terminal of the primary winding 67. The dashed line 71a represents the magnified rectified line voltage centered at eighteen electrical degrees into the cycle. In other words, lines 71 and 71a both represent the same rectified line voltage but on dramatically-different time scales. (Eighteen electrical degrees was selected arbitrarily for explanation purposes.)

Figure 4:
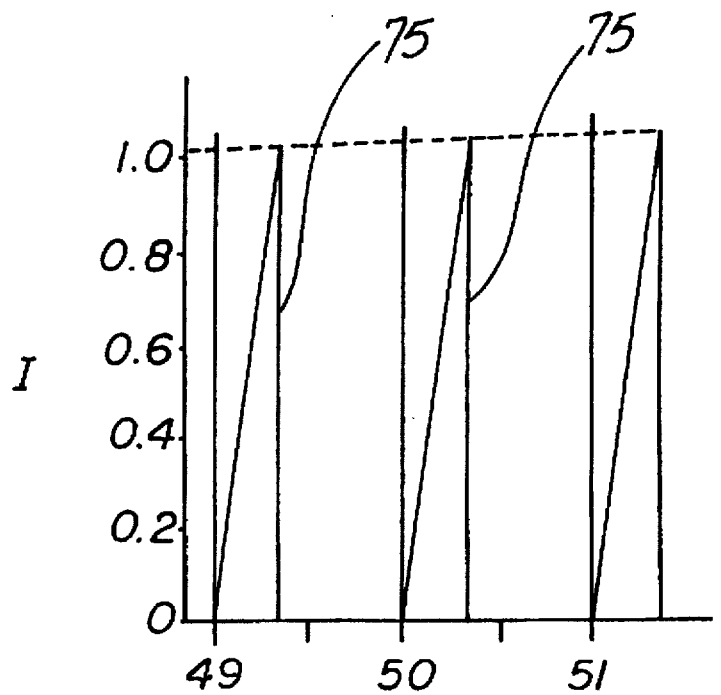
FIG. 4 is a graph showing the current through the primary winding of the power transformer which results when the switching transistor is "gated" as shown on the graph of FIG. 2.

When the gate 61 of the switching transistor 37 is driven positive, the transistor 37 is saturated "on," the circuit through the primary winding 67 is completed and the full-wave-rectified line voltage is applied to such winding 67. FIG. 4 is a graph, the traces 75 of which represent the current through the primary winding 67 of the transformer 39.

The slope (di/dt) of such current (represented by the traces 75) is determined by the voltage across the transformer primary 67 ($v_p$) and by the primary inductance ($L_p$) in accordance with the following:

$$v_p = L_p \frac{di}{dt}$$

$$\text{slope} \frac{[di]}{[dt]} = \frac{v_p}{L_p}$$

$$i_{peak} = \text{slope} \times \text{pulse width } (T_{on})$$

Figure 5:
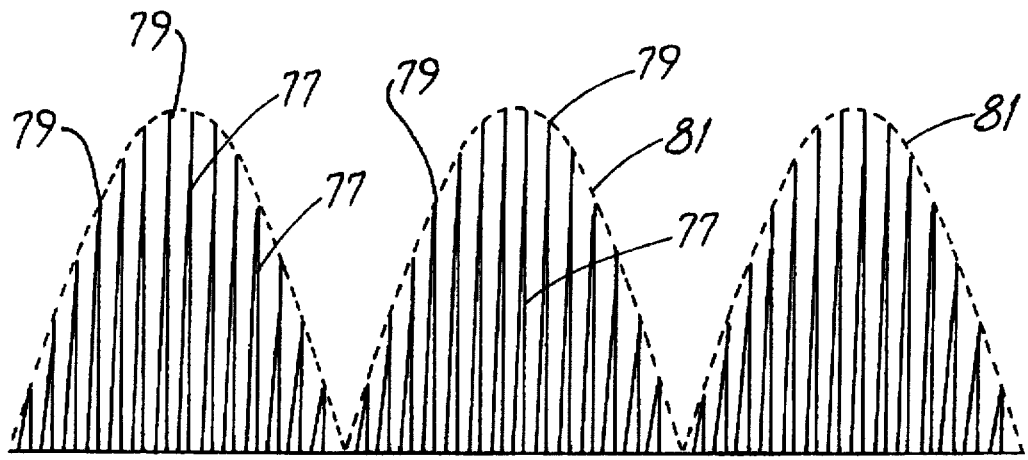
FIG. 5 is a graph showing, over one and one-half cycles of the AC power line, the wave form of the current through the primary winding of the power transformer as shown in FIG. 4. The pulse rate has been dramatically reduced for clarity of explanation.

FIG. 5 is a graph, the traces 77 of which represent the current on the line 23 and into the primary winding 67 for one and one-half cycles of voltage on the line 17. (It is to be noted that in FIG. 5 and for purposes of clarity of explanation, the pulse rate, controlled by the PWM controller 35, has been reduced to about 25–30 pulses for each cycle of the AC line 17. An exemplary actual pulse rate for the PWM controller is 70–80 KHz and, most preferably, 76 KHz.)

Since the pulse width is essentially constant throughout the cycle and the peak value of the current is proportional to the value of the rectified line voltage across the transformer primary winding 67, the peak values of current, represented by the points 79, lie on a rectified sine curve represented by the trace 81.

At the time the switching transistor 37 is switched off, the energy stored in the transformer 39 is:

$$E = 1/2 (i_{peak})^2 L_p$$

This energy is directed along the line 83 to the output filter capacitor 43 through the diode 41. The negative voltage (represented by the trace 85 in FIG. 3) appearing on the primary winding 67 is equal to the output voltage on the line 83 times the transformer turns ratio. In a highly specific embodiment, such ratio is 1.5:1.

Figure 6:
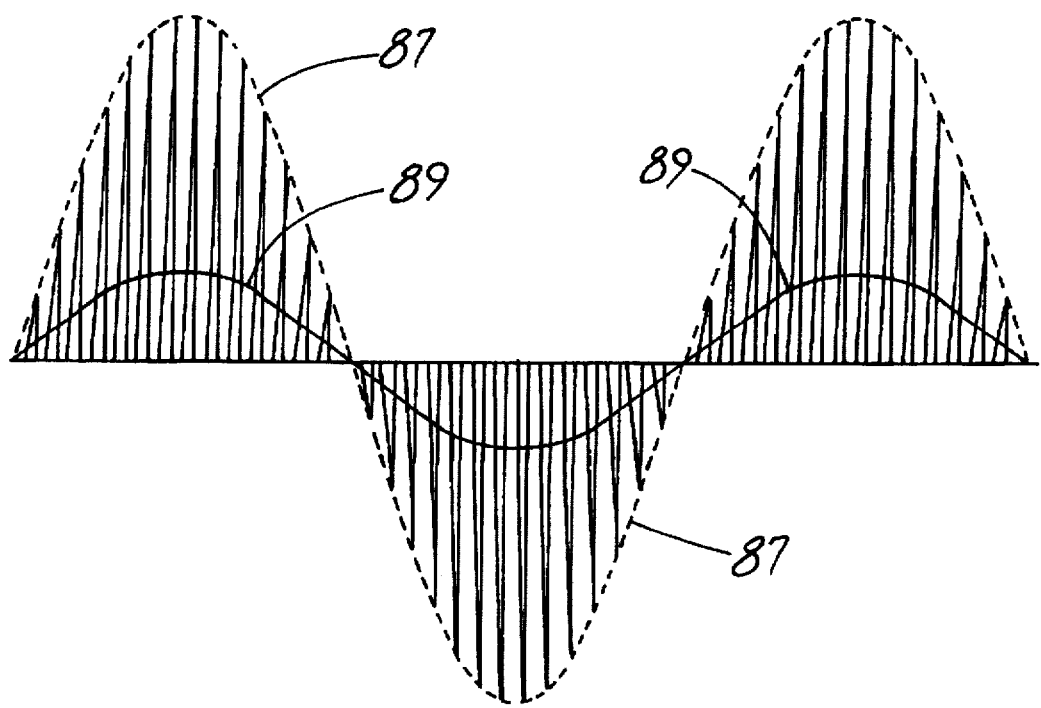
FIG. 6 is a graph showing, in dashed line, the current wave form at the input side of the power supply line rectifier. Such graph also shows, in solid line, the current wave form at the input side of the power supply line filter. The pulse rate has been dramatically reduced for clarity of explanation.

FIG. 6 is a graph, the traces 87 of which represent the current on the line 19 which is the input to the rectifier 21. The wave form 89 represents the current on the line 17 at the input to the line filter 15. It is to be appreciated that such current is virtually a perfect sine wave and is substantially in phase with the voltage. In the new power supply 10, the power factor exceeds 0.99, harmonic distortion is less than 5% and the efficiency is in excess of 85%.

The Active Filter

The response of the PWM control loop 55 is made very slow in order to maintain a nearly-constant pulse width. Because of such slow response, the PWM controller 35 is unable to "track" and respond to variations in lamp current with speed sufficient to maintain the lamp 31a ignited. The active filter 11 was developed to improve the response characteristics of such controller 35.

Figure 7:
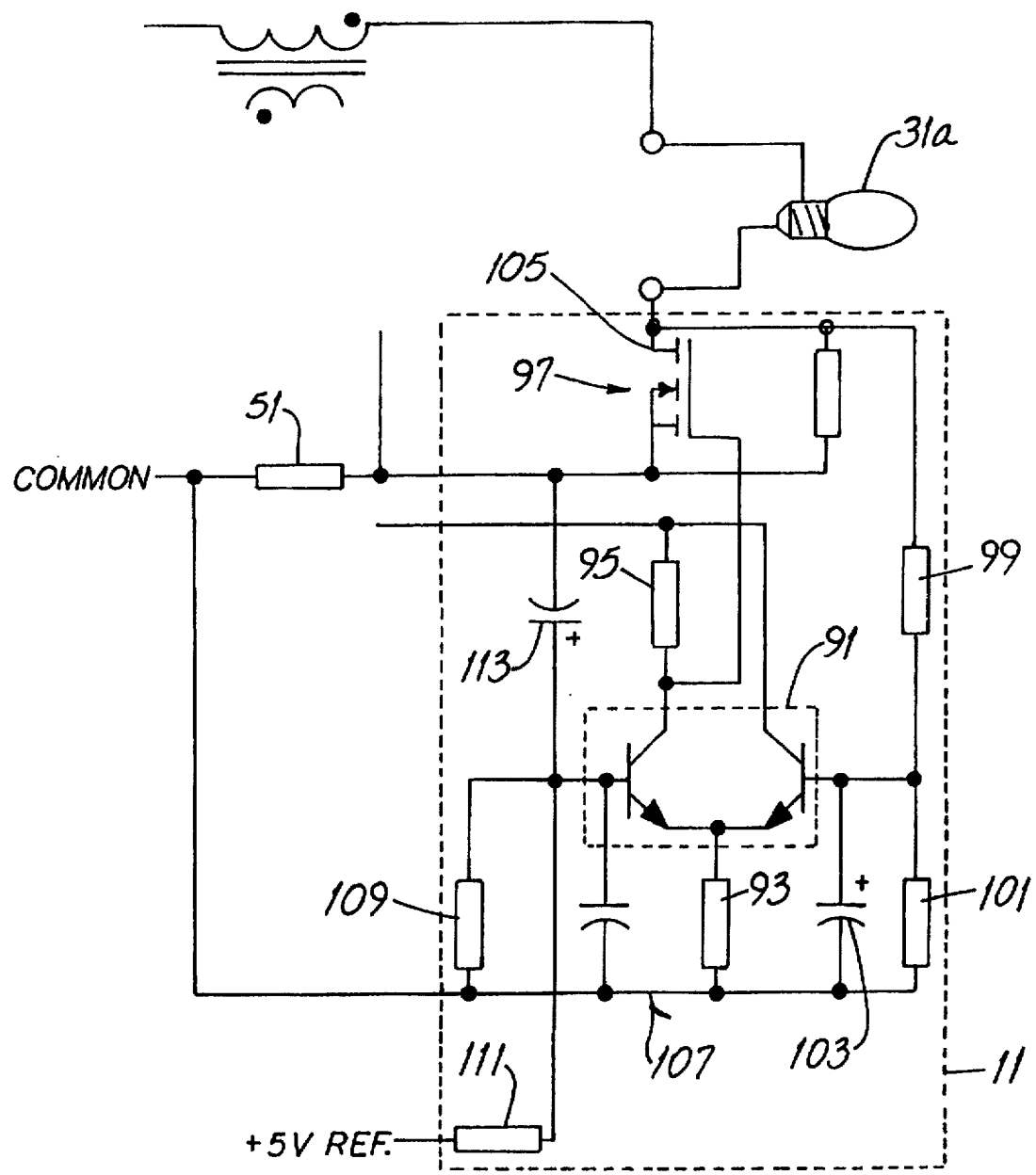
FIG. 7 is a detailed circuit diagram of the active filter portion of the power supply of FIG. 1.

Referring also to FIG. 7, aspects of the active filter 11 will now be described. Such filter 11 includes a difference amplifier comprising back-to-back transistors 91 and the resistors 93, 95. Such amplifier drives a power FET 97 in series with the lamp 31a. A network comprising the resistors 99, 101 and the capacitor 103 is connected from the drain 105 the FET 97 to the common 107 and establishes the DC voltage drop across the power FET 97.

A divider network comprising the resistors 109 and 111 is connected between a +5 volt reference and the common 107 and provides a DC reference voltage for the difference amplifier. A capacitor 113 couples the variation in voltage across the current sampling resistor 51 to the input of the difference amplifier. This causes the voltage across the lamp 31a to increase (because the voltage across the power FET 97 decreases) when the lamp current decreases. In function, the electrical characteristics of the filter 11 "look like" an inductor exhibiting a high-but-variable inductance which is connected in series with the lamp 31a. The filter 11 smooths the current through the lamp 31a.

The Starting Circuit

Figure 8:
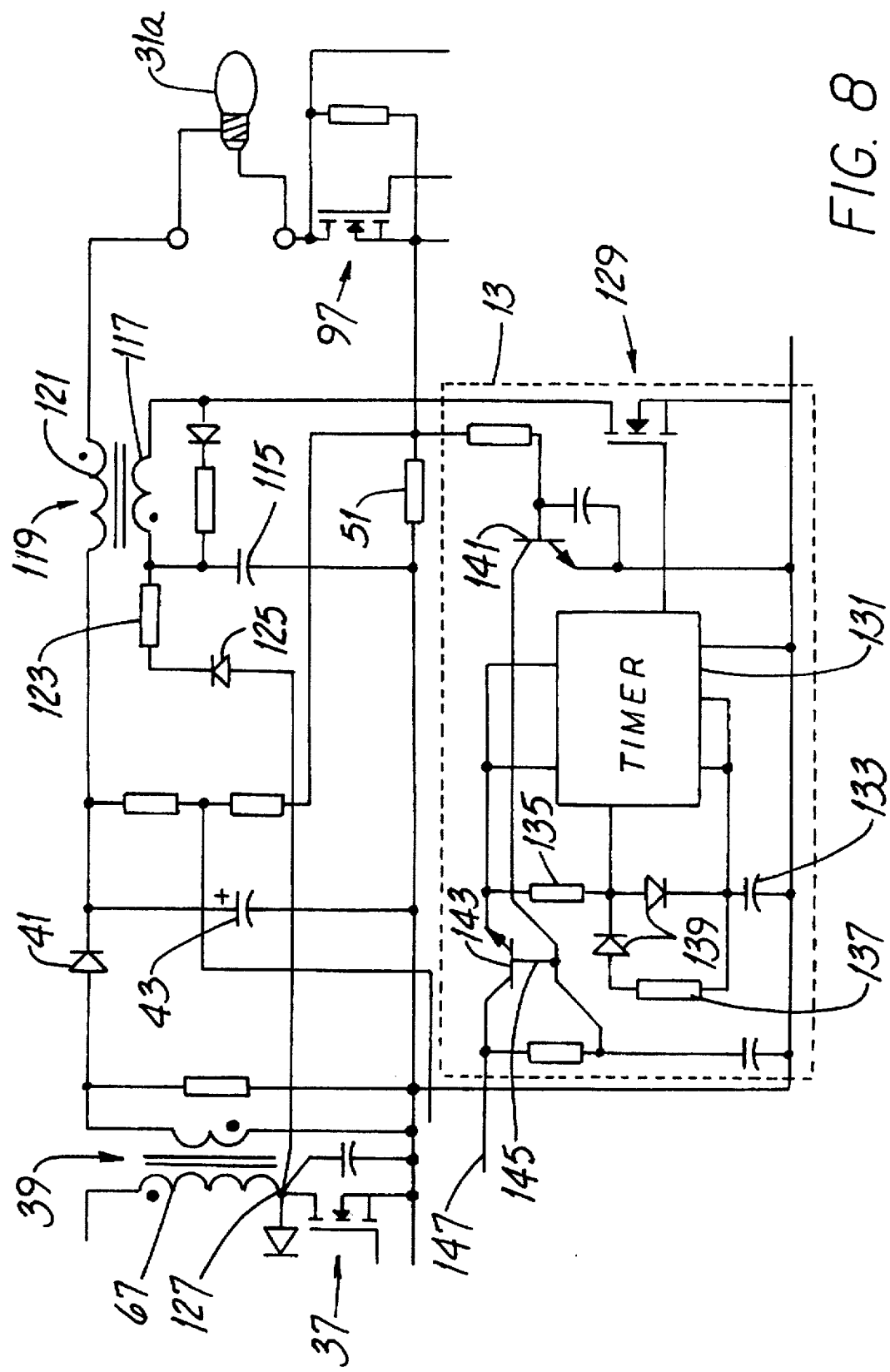
FIG. 8 is a detailed circuit diagram of the starting circuit portion of the power supply of FIG. 1.

A high-voltage starting pulse must be applied to the metal halide lamp 31a in order to "strike an arc" and ignite the lamp 31a. The starting circuit 13 is shown in FIG. 8.

The starting pulse is generated by charging the capacitor 115 to a voltage greater than 400 volts. Such capacitor 115 is then discharged through the primary winding 117 of the starter transformer 119 by switching the power FET 97 to a conducting or "on" state. The amplitude of the pulse, about 4000 volts, on the secondary winding 121 of the starter transformer 119 is about one-half the voltage across the capacitor 115 multiplied by the turns ratio of the transformer 119.

The width of the pulse, about one microsecond in the depicted power supply 10, is determined by the value of the capacitor 115. In a specific embodiment, the turns ratio of the starter transformer 119 is 20:1. (In this specification, the primary and secondary windings 117, 121 of the starting transformer 119 are sometimes referred to as the "starting primary winding" and the "starting secondary winding," respectively.)

The capacitor 115 is charged through the resistor 123 and the diode 125 which are connected in series between the end of the winding 117 and the switching FET 37. When the FET 37 is switched "off" to a non-conducting state, the end 127 of winding 67 goes to a positive voltage. The magnitude of such voltage (which may be measured across the capacitor 43 is the turns ratio of the power transformer 39 (1.5:1 in a specific embodiment) multiplied by the open circuit output voltage (220 v. in a specific embodiment), the product being added to the unfiltered rectified line voltage.

The gate pulse needed to switch the FET 129 to a conducting state is provided by an integrated circuit timer 131. The pulse width of the "turn-on" pulse is determined by the values of the timing capacitor 133 and the charging resistor 135. Using the values specified, the pulse width is about 3.5 microseconds.

The duration of the time over which the FET 129 is maintained in a non-conducting state is determined by the values of the timing capacitor 133 and the discharge resistor 137. Using the values specified, such "off time" is about 10 milliseconds. The diodes 139 provide current steering to separate the charge and discharge paths.

The transistors 141 and 143 disable or turn off the starting circuit 13 once an arc is struck and the lamp 31a is ignited. When the lamp 31a ignites and starts conducting current, the resulting voltage across the current sampling resistor 51 causes the transistor 141 to be saturated to a conducting state (i.e., "turned on") and the base 145 of the transistor 143 is thereby brought to a voltage that is within about 0.3 volt of that of the common 107, nominally about zero. This switches the transistor 143 to a non-conducting state and removes the +17 volt supply voltage on the line 147 from the timer 131. The starting circuit 13 is thereby turned off.

Figure 9A:
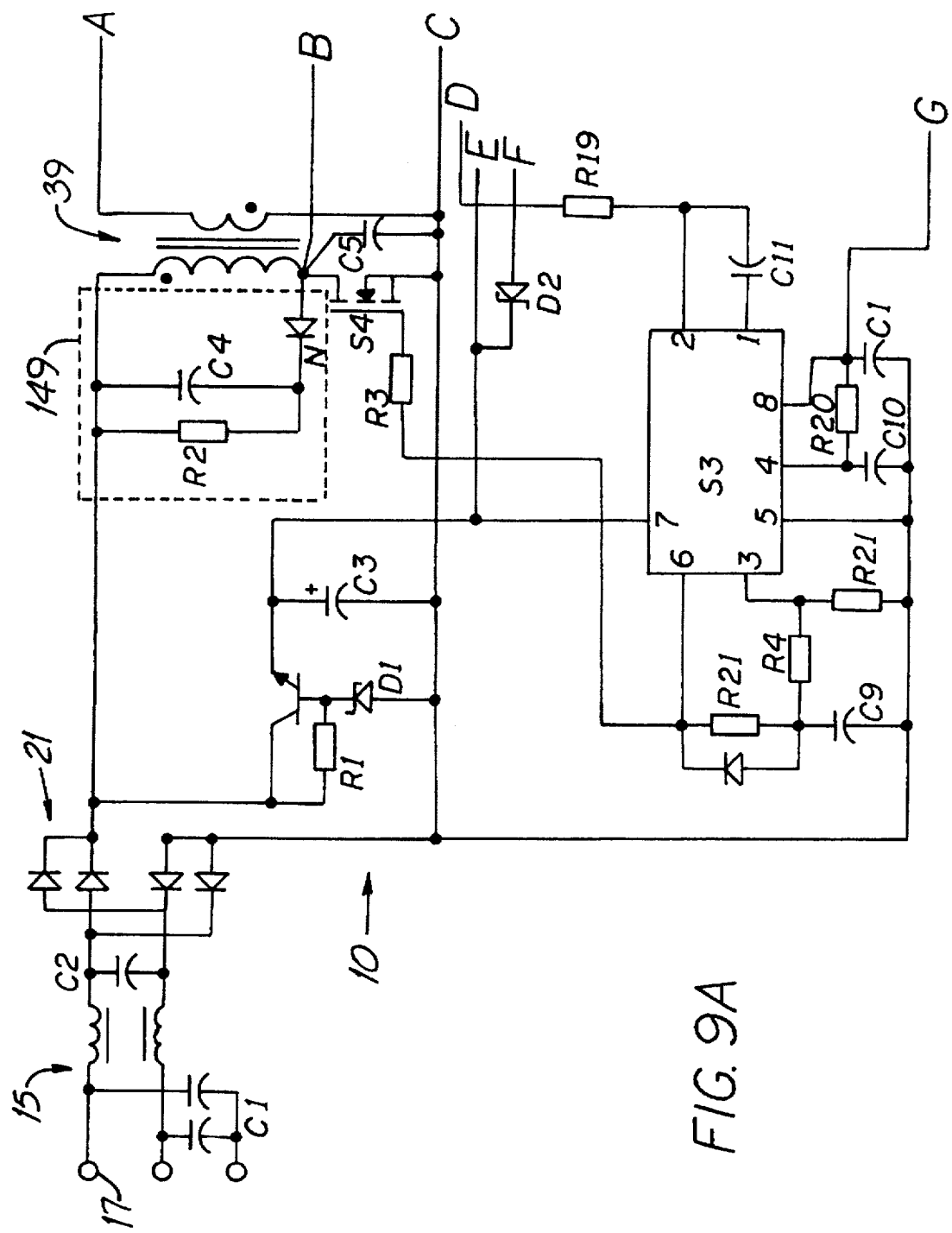
FIGS. 9A, 9B and 9C comprise a detailed circuit diagram of the power supply shown in FIG. 1.
Figure 9B:
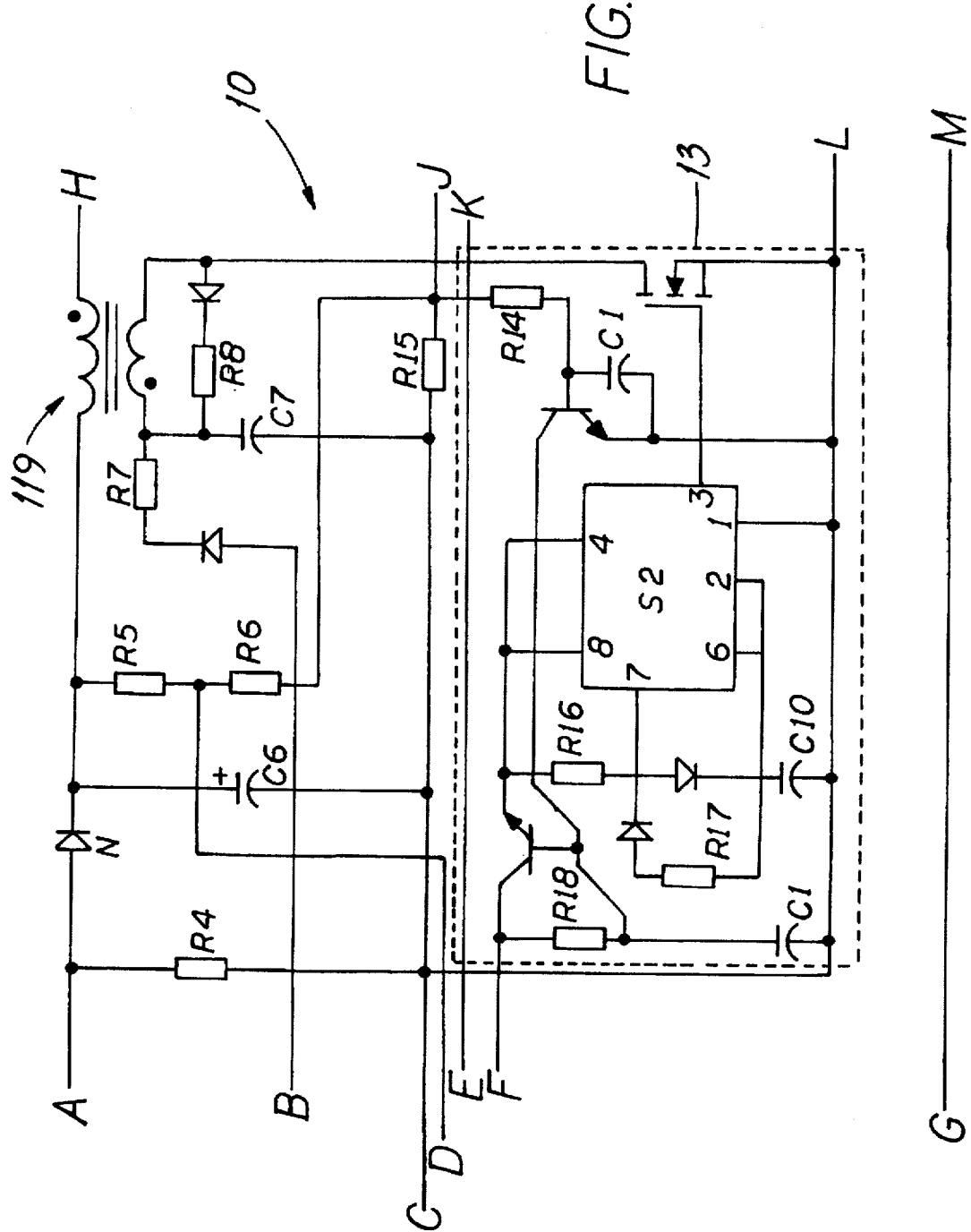
Figure 9C:
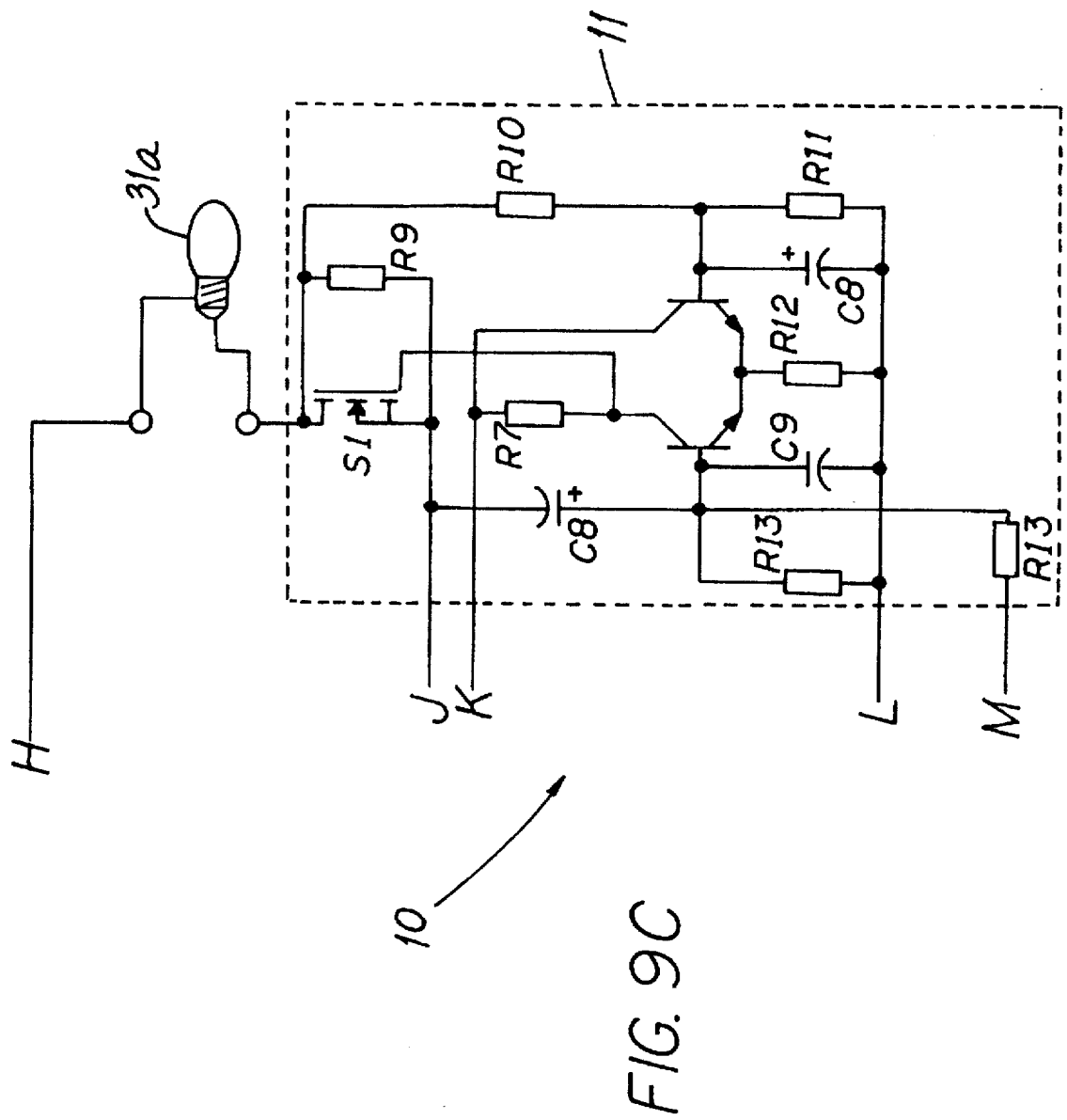

FIG. 9 shows the new power supply 10. Its snubber circuit 149, starting circuit 13 and active filter 11 are bounded by dashed outlines.

To summarize some of the features of the new power supply 10, the output of the rectifier 21 on the line 23 is unfiltered and the pulse width (duty-cycle) of the PWM controller 35 is substantially constant throughout the period of the AC voltage on the power line 17. And the switching-frequency current components are filtered from the current on the line 19 directed to the rectifier 21. The new power supply 10 exhibits an operating power factor in excess of 99% and harmonic distortion less than about 5%.

After understanding the foregoing, one of ordinary skill in the art will appreciate how a low-cost power supply 10 may be configured. The PWM controller control loop 55 would use only voltage feedback (instead of dual-parameter feedback) and the active filter 11 made responsive to voltage rather than current.

The following components have been found useful in making a specific embodiment of the new power supply 10:

| Component | Value or Type |
|---|---|
| C1 | 0.01 mf |
| C2 | 0.47 mf |
| R1 | 20K |
| D1 | 1N4746 |
| C3 | 100 mf |
| R2 | 22K, 1W |
| C4 | 270 pf |
| Item 15, FIG. 9A | Two windings on one core, total 60 mH |
| R3 | 100 ohm |
| Item 39, FIGS. 8, 9A | max pri. ind. 213 mH secondary turns = 0.6 primary turns |
| R4 | 22K |
| C5 | 220 pf |
| N | ultrafast diode |
| C6 | 100 mf |
| R5 | 220K |
| R6 | 2.2K |
| R7 | 10K |
| C7 | 0.047 mf |
| R8 | 1.5 ohm |
| S1 | MTP3N50 |
| R9 | 250 ohm, 1 W |
| R10 | 13K |
| R11 | 4.3K |
| C8 | 4.7 mf |
| R12 | 1K |
| C9 | 0.0033 mf |
| R13 | 6.2K |
| R14 | 3.9K |
| R15 | 3.0 ohm, 1 W |
| S2 | 555 timing chip |
| R16 | 3.3K |
| C10 | 0.0015 mf |
| R17 | 10M |
| R18 | 30K |
| R19 | 100K |
| C11 | 1.0 mf |
| R20 | 6.8K |
| S3 | UC3844N |
| R21 | 4.7K |

-continued

| Component | Value or Type |
|---|---|
| S4 | 600 V |
| D2 | 3 V |

While the principles of the invention have been described in connection with a preferred embodiment, it is to be understood clearly that such embodiment is exemplary and not limiting.

What is claimed:

1. A power supply for an arc-discharge lamp including:
   a rectifier having an AC input and a DC output;
   a power transformer having a single power primary winding, such power primary winding being connected to the DC output,
   the power transformer also has a power secondary winding connected to the lamp;
   a PWM controller coupled to the power primary winding for controlling the flow of power therethrough, and wherein:
   the lamp has an active filter connected in series therewith for reducing the rate of change of the current flowing through the lamp; and
   the active filter includes a controlled switch connected to the negative terminal of the lamp.

2. The power supply of claim 1 wherein:
   the load is a metal halide lamp; and
   the power supply includes a resistor in series with the lamp and wherein the variable voltage results from lamp current flowing through the resistor.

3. The power supply of claim 1 wherein the power primary winding has unfiltered DC power flowing therethrough.

4. The power supply of claim 2 wherein the power primary winding has unfiltered DC power flowing therethrough.

5. The power supply of claim 1 wherein the power primary winding has unfiltered DC power flowing therethrough.

6. The power supply of claim 1 wherein:
   such power supply is connected to an AC power line; and
   the power supply includes a line filter interposed between the AC power line and the rectifier, whereby switching transients reflected to the AC power line are substantially prevented from entering the rectifier.

7. The power supply of claim 2 wherein:
   such power supply is connected to an. AC power line; and
   a line filter is interposed between the AC power line and the rectifier, whereby switching transients reflected to the AC power line are substantially prevented from entering the rectifier.

8. The power supply of claim 1 including a load starting circuit coupled between the power secondary winding and the load.

9. The power supply of claim 8 wherein the starting circuit includes a starting transformer having:
   a starting primary winding connected to a pulse capacitor; and
   a starting secondary winding connected to the load, whereby a voltage pulse from the capacitor is multiplied by the starting transformer and applied to the load for load ignition.

10. The power supply of claim 9 wherein the starting circuit also includes a charging circuit for charging the pulse capacitor and wherein:

the charging circuit is connected to the power primary winding; and the pulse capacitor is charged when substantially no current is flowing in the power primary winding.

11. The power supply of claim 10 wherein the pulse capacitor is intermittently charged.

12. The power supply of claim 1 wherein the PWM controller has a dual-parameter feedback signal directed thereto.

13. The power supply of claim 12 wherein the dual-parameter feedback signal includes a voltage-related component and a current-related component.

14. A power supply for an arc-discharge lamp including:

a rectifier having an AC input and a DC output;

a power transformer having a single power primary winding, such power primary winding being connected to the DC output;

the power transformer also has a power secondary winding connected to the lamp;

a PWM controller coupled to the power primary winding for controlling the flow of power therethrough, and wherein:

the lamp has a smoothing circuit connected thereto for reducing the rate of change of the current flowing through the lamp, the smoothing circuit including a difference amplifier for increasing the voltage across the lamp when lamp current decreases;

the power supply is connected to an AC power line; and the power supply includes a line filter interposed between the AC power line and the rectifier, whereby switching transients reflected to the AC power line are substantially prevented from entering the rectifier.

15. A power supply for an arc-discharge lamp including:

a rectifier having an AC input and a DC output;

a power transformer having a power primary winding connected to the DC output and a power secondary winding connected to the lamp;

a PWM controller coupled to the power primary winding for controlling the flow of power therethrough, and wherein:

the lamp has a smoothing circuit connected thereto for reducing the rate of change of the current flowing through the lamp;

a starting circuit is connected between the power secondary winding and the lamp, the starting circuit including a starting transformer having a winding in series with the lamp and another winding connected to a starting capacitor for striking an arc in the lamp;

the PWM controller has a dual-parameter feedback signal directed thereto; and the dual-parameter feedback signal includes a voltage-related component and a current-related component.

* * * * *